Figure 1:
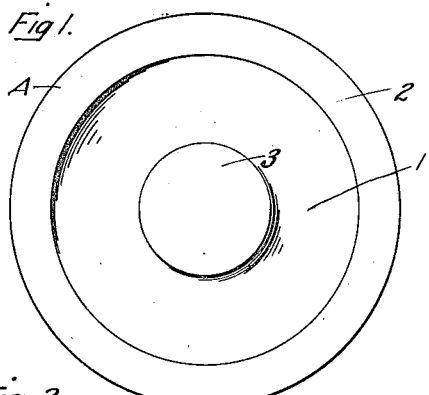

Nov. 4, 1924.

W. E. HOKE

PRECISION GAUGE

Filed April 9, 1919

1,514,525

INVENTOR
William E. Hoke
BY S. Jay Teller
ATTORNEY

Patented Nov. 4, 1924.

1,514,525

UNITED STATES PATENT OFFICE.

WILLIAM E. HOKE, OF ST. LOUIS, MISSOURI, ASSIGNOR TO PRATT & WHITNEY COMPANY, OF NEW YORK, N. Y., A CORPORATION OF NEW JERSEY.

PRECISION GAUGE.

Application filed April 9, 1919. Serial No. 288,788.

*To all whom it may concern:*

Be it known that I, WILLIAM E. HOKE, a citizen of the United States, residing at St. Louis, Missouri, have invented certain new and useful Improvements in Precision Gauges, of which the following is a specification.

The invention relates to gauge blocks and gauges such as set forth in my copending application for precision gauges, Serial No. 288,787, filed on even date herewith. The object of the invention is to provide improved gauge blocks of predetermined lengths which are so constructed as to be adapted to be more readily placed in a series in end to end contact and to be more readily separated from such a series.

In the accompanying drawing I have illustrated several different gauge blocks embodying the invention, but it will be understood that the drawing is intended for illustrative purposes only and is not to be construed as defining or limiting the scope of the invention, the accompanying claims being relied upon for that purpose.

Of the drawing:

Figs. 1 and 2, and 3 and 4 are end and longitudinal sectional views respectively of different gauge blocks constructed in accordance with the invention.

Figure 3:
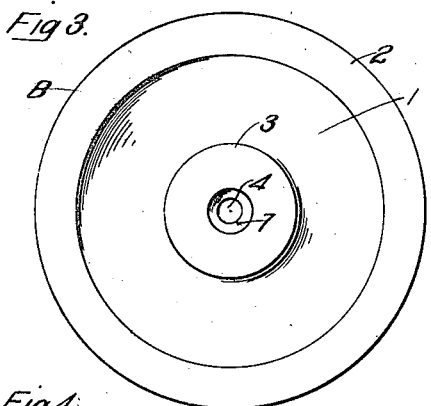
Figure 4:
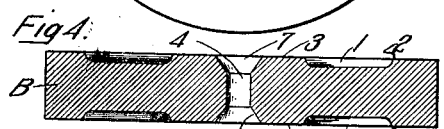
Figure 5:
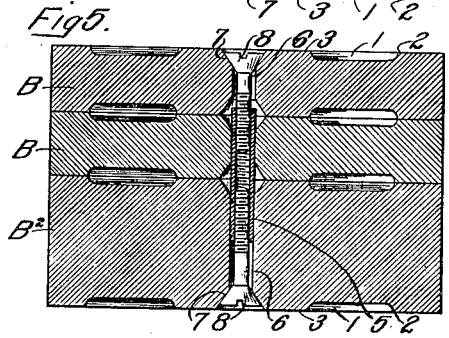

Fig. 5 is a longitudinal sectional view of a gauge consisting of a series of gauge blocks such as shown in Figs. 3 and 4.

Figs. 6 and 7, and 8 and 9 are end and longituinal sectional views respectively of still different gauge blocks constructed in accordance with the invention.

Figure 8:
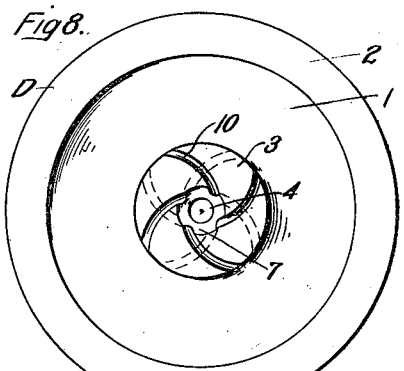
Figure 9:
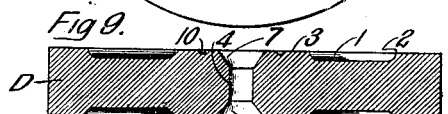
Figure 10:
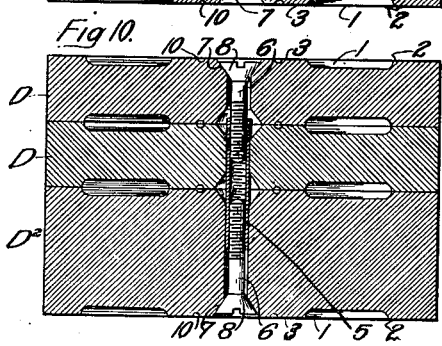

Fig. 10 is a longitudinal sectional view of a gauge consisting of a series of gauge blocks such as shown in Figs. 8 and 9.

Figure 2:
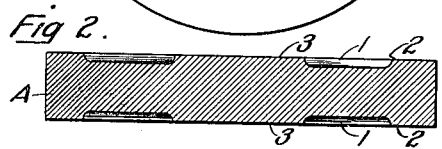

In Figs. 1 and 2 of the drawing I have shown a gauge block A constructed in accordance with the invention. The block A is shown as being circular in form, but this is not essential as the invention can be applied to blocks having other shapes. The block A is provided with opposite plane or flat end faces which are in predetermined precise relationship to each other. Preferably, as shown, these faces are parallel and are at a predetermined distance apart. By means of the improved method and machine as set forth in my copending application for method of and machine for making gauges and similar articles, Serial No. 289,591, filed April 12, 1919, each block may be made without any error greater than one-millionth of an inch in the flatness of the end surfaces or in the length between them. Ordinarily the blocks are furnished in sets with assorted lengths, the transverse size and shape of all of the blocks of the set preferably being the same. The lengths of the blocks are either multiples or definite fractions, usually decimal fractions, of a predetermined unit of length. This unit may be the inch, or the centimeter or any other convenient unit of length. If the inch is the unit decided upon, the lengths of the blocks are ordinarily multiples of a thousandth of an inch or multiples of a ten-thousandth of an inch. For a given set of blocks with lengths in multiples of thousandths the lengths may be so selected as to make it possible, by combining different blocks in wringing contact end to end, to construct a built-up gauge having any desired length measured in inches and thousandths; and, by adding to the set other blocks having lengths in multiples of ten-thousandths it is possible, by combining the blocks, to construct a gauge having any desired length measured in inches and ten-thousandths.

It is well known that several gauge blocks of the type herein shown will adhere with considerable force when properly wrung together. The preferred method of effecting wringing is to make the contact faces perfectly clean and then to apply a small quantity of liquid, such for instance as alcohol, near the center thereof. By relatively sliding the blocks more or less circularly the liquid is permitted to evaporate, thus gradually reducing the size of the liquid film. When the film covers the entire face, or even the major portion thereof, no wringing is possible as the liquid serves as a lubricant. When the liquid film is reduced to a relatively small area, the blocks are drawn together and a maximum wringing effect is secured. When the gauge blocks are relatively large so as to provide extended surfaces of contact, difficulty is frequently experienced in effecting wringing because of the presence of an air film between the blocks which cannot be readily forced out. Furthermore, when proper wringing is finally effected, the tendency for the blocks to adhere is so great as to make it very difficult to separate them when desired. In accordance with the present invention I avoid both of these difficulties by reducing the block or cutting it away at one or both ends below the main end face or faces thereof, thus diminishing the area of contact.

Figs. 1 and 2 show what is perhaps the simplest form of the invention applied to the block A. At one end of the block, and preferably at both ends, there is provided a reduced portion which by preference is sufficiently large to materially diminish the area of the contact surfaces. As illustrated, the reduced portion is in the form illustrated at 1, and is positioned to leave the edge and portion 2 of the main surface intact and to leave at least a major part of the central portion 3 also intact. When the block is circular, as shown, the reduced portion 1 is annular in form.

When a series of blocks such as A are to be wrung together, wringing is more easily effected as the area of the air film is greatly diminished. After wringing has been effected the blocks can be more easily separated by reason of the diminished area of contact.

While it is possible, and in many cases preferable, to combine the blocks and to use them without any special mechanical means for holding them together, I prefer to make it possible to connect the blocks mechanically so that reliance need not be placed solely upon the force resulting from wringing contact. Each block is therefore preferably provided with an abutment which is positioned between the main end faces or at least between the confines thereof, this abutment being adapted to be engaged by a suitable connecting means which does not obstruct the main gaging faces. Preferably, each block is provided with an opening adapted to receive the said connecting means which extends from one block to another. Preferably the opening in each block is so shaped as to form the said abutment at a position between the said end faces.

In Figs. 3 and 4 there is shown a block B which is similar to the block A, but which is provided with a central hole 4 extending entirely through the block perpendicularly to the parallel end surfaces. When a number of blocks B, B, B¹ are arranged in a series, as shown in Fig. 5, they can be connected by a suitable tie-rod extending through the holes in the several blocks. The tie-rod may be varied as to details but, as shown, this consists of a central threaded tube 5 adapted to enter the holes 4, and two screws 6, 6 entering the tube. Preferably, in order that there may be no projections beyond the end surfaces of the outermost blocks, the holes 2 in the several blocks are countersunk, at least at one end and preferably at both ends, as indicated at 7. The countersinking of the holes provides abutments such as aforesaid, these abutments being engaged by the connecting means which in the present case is a tie-rod. The screws 4, 4 are formed with heads 8, 8 adapted to enter the countersinks 7, 7 and engage the abutments in the outer ends of the end blocks and to lie below the corresponding outer faces thereof. Ordinarily a number of screws of different lengths are provided so as to accommodate different combinations of blocks. It will be seen that by turning the screws the tie-rod as a whole can be shortened to draw and hold the blocks together.

In placing the blocks together in a series, as shown in Fig. 5, the blocks may be first assembled with a small amount of liquid between them without, however, making any initial attempt to wring them together. After the entire series of blocks is complete then the blocks may be wrung together by turning first one and then another while effecting endwise pressure. It will be seen that the tie-rod serves to hold the blocks in register while being so turned.

In order to still further facilitate the wringing of the blocks, I prefer under some circumstances to provide one or both of the end faces with suitable grooves or scores. The grooves serve to further diminish the area of contact. Their primary purpose, however, is to permit excess liquid to escape, and there is thus effected what may be described as a shearing action. In this way the liquid film is quickly reduced to the size required for maximum wringing. It will be seen that the grooves are illustrated as being formed in the central portions of the contact faces but the area of these grooves is relatively small and the greater part of the central portion therefor remains intact.

Figure 6:
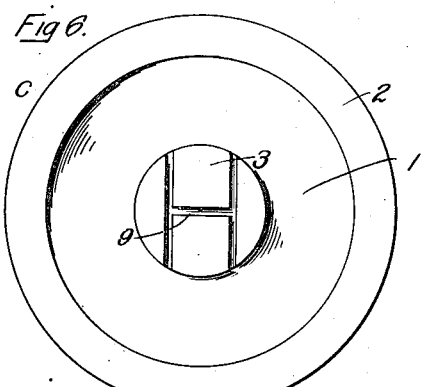
Figure 7:
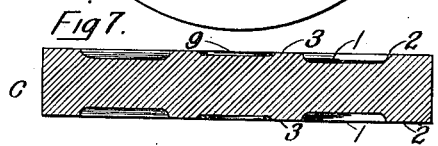

In Figs. 6 and 7 I have shown a block C having the end faces provided with grooves 9. As illustrated, the block C is otherwise similar to the block A, being similarly provided with a reduced portion 1. While this is preferable, it is to be understood that the grooves such as 9 are not necessarily associated with the reduced portion such as 1. As shown in the drawing, the grooves 9 are in the form of the letter H, but this arrangement is not essential.

In Figs. 8 and 9 I have shown a block D which is similar to the block C, but it is provided with a countersunk central hole as described in connection with the block B. The grooves 10 of the block D are differently arranged, being spiral in form.

In Fig. 10 I have shown a gauge comprising a series of blocks D, D, D¹. This gauge is similar to the gauge shown in Fig. 5, and repetition of the description is unnecessary.

What I claim is:

1. A guage block provided with opposite parallel flat end gaging faces at a predetermined distance apart, the block having portions of both ends between the edge and central portion reduced below the gaging faces thereof, the central portion of said end faces being grooved.

2. A gauge block as set forth in claim 1 having an abutment positioned between the confines of the gaging faces and adapted to be engaged by connecting means whereby the block may be connected in face to face contact with one or more similar blocks.

3. A guage block as set forth in claim 1 having an opening therein forming an abutment positioned between the opposite gaging faces thereof and adapted to be engaged by a suitable connecting means extending into the opening whereby the block may be connected in face to face contact with one or more similar blocks.

4. A gauge block as set forth in claim 1 having a central hole perpendicular to the parallel faces and adapted to receive a suitable connecting means whereby the block may be connected in face to face contact with one or more similar blocks.

5. A gauge block as set forth in claim 1 having a central hole perpendicular to the parallel faces and adapted to receive a suitable connecting means whereby the block may be connected in face to face contact with one or more similar blocks.

6. A gauge block provided with opposite parallel flat end gaging faces at a predetermined distance apart, the block having a portion of one end reduced below the gaging face thereof and having a central hole perpendicular to the parallel faces and countersunk to provide an abutment between the said faces, the said abutment being adapted to be engaged by a suitable connecting means extending into the hole whereby the block may be connected in face to face contact with one or more similar blocks.

7. A plurality of gauge blocks provided with opposite flat end gaging faces in predetermined precise relationship to each other, said blocks having a portion of one end reduced below the gaging face thereof, and abutment positioned between the confines of the gaging face and adapted to be engaged by a connecting means whereby the blocks may be connected in face to face contact with one or more similar blocks, the said connecting means engaging the abutments of the end blocks of the series and positioned between the confines of the end faces so as to leave the said end faces unobstructed.

8. A plurality of gauge blocks provided with opposite flat parallel end gaging faces at a predetermined distance apart, said blocks having a portion of one end reduced below the gaging face thereof, said blocks having a central hole perpendicular to the parallel faces and adapted to receive a suitable connecting means whereby said blocks may be connected in face to face contact with other similar blocks, and tie-rod extending through the holes in the several blocks to retain them in position.

9. A plurality of gauge blocks provided with opposite flat end gaging faces at a predetermined distance apart, one of the end faces being grooved and having a central hole perpendicular to the end faces and adapted to receive a suitable connecting means whereby said blocks may be connected in face to face contact with other similar blocks, and a tie-rod extending through the holes in the several blocks to retain them in position.

10. A plurality of gauge blocks provided with opposite flat end gaging faces in predetermined precise relationship to each other, said blocks having a portion of one end reduced below the gaging face thereof, a portion of said gaging face being grooved, a central hole extending perpendicularly to the end face and adapted to receive a suitable connecting means whereby said blocks may be connected in face to face contact with one or more similar blocks, and a tie-rod extending through the holes in the several blocks to retain them in position.

11. A plurality of gauge blocks provided with opposite flat parallel end gaging faces at a predetermined distance apart, said blocks having a portion of one end reduced below the gaging faces thereof and having a central hole perpendicular to the end faces and countersunk to provide an abutment between the said faces, the said abutment being adapted to be engaged by a suitable connecting means extending into the hole whereby the blocks may be connected in face to face contact with other similar blocks, and a tie-rod extending through the holes in the several blocks and having heads engaging countersunk abutments thereof and positioned so as to leave unobstructed the end gaging faces of the gauge.

In testimony whereof, I hereto affix my signature.

WILLIAM E. HOKE.